United States Patent [19]

Krämer et al.

[11] 4,072,491
[45] Feb. 7, 1978

[54] METHOD FOR PRODUCING BLOWN HOLLOW GLASS OBJECTS

[75] Inventors: Heinz Krämer, Oldenburg; Norbert Peretti, Mulheim (Ruhr); Helmut Waschneck, Dusseldorf, all of Germany

[73] Assignee: Owens-Illinois, Inc., Toledo, Ohio

[21] Appl. No.: 725,735

[22] Filed: Sept. 23, 1976

Related U.S. Application Data

[62] Division of Ser. No. 585,655, June 10, 1975, Pat. No. 4,008,063.

[30] Foreign Application Priority Data

June 26, 1974 Germany ............................. 2430656

[51] Int. Cl.² ................................................ C03B 9/14
[52] U.S. Cl. ........................................ 65/72; 65/76; 65/80; 65/82
[58] Field of Search ................... 65/21, 68, 72, 76–82, 65/208, 215, 226, 231, 244, 248, 305, 316, 362

[56] References Cited

U.S. PATENT DOCUMENTS

| 275,298 | 4/1883 | Wallace | 65/316 |
|---|---|---|---|
| 861,379 | 7/1907 | Meeker | 65/305 |
| 1,259,281 | 3/1918 | Peiler | 65/80 |
| 1,449,808 | 3/1923 | Boals | 65/305 |
| 1,898,251 | 2/1933 | Kopp | 65/362 |
| 2,238,198 | 4/1941 | Weber | 65/248 |
| 2,272,119 | 2/1942 | Jaeckel | 65/362 X |
| 2,843,973 | 7/1958 | Clignet | 65/248 |
| 3,357,809 | 12/1967 | Colchagoff | 65/72 X |
| 3,468,648 | 9/1969 | Nowak | 65/362 X |

*Primary Examiner*—Robert L. Lindsay, Jr.
*Attorney, Agent, or Firm*—Toren, McGeady and Stanger

[57] ABSTRACT

A blown hollow glass object having an optical inner wall structure is produced by pressing a plunger against a heated glass blank which has been inserted into a hollow mold cavity. The plunger is configured to taper toward a narrower end in the direction in which the plunger is introduced into the mold cavity. After formation of the optical inner wall structure by pressing of the plunger against the glass blank, the plunger is longitudinally withdrawn. The optical inner wall of the glass object is formed as a result of a generally helically shaped molding pattern defined about the exterior surface of the plunger. The molding pattern is configured in such a way as to prevent deformation of the optical inner wall structure when the plunger is withdrawn. More specifically, the helically shaped molding pattern on the exterior of the plunger is formed to comprise a main pattern surface and a secondary pattern surface extending at a predetermined angle relative to each other or relative to the diameter of the plunger so that withdrawal of the plunger may be appropriately effected.

3 Claims, 6 Drawing Figures

METHOD FOR PRODUCING BLOWN HOLLOW GLASS OBJECTS

This is a division of application Ser. No. 585,655 filed June 10, 1975 now Pat. No. 4,008,063, granted Feb. 15, 1977.

BACKGROUND OF THE INVENTION

The present invention relates to a method and apparatus for producing blown hollow glass bodies having an optical inner wall structure. More specifically, the invention is directed toward a procedure wherein a heated glass blank having a structured inner surface is blown in a blank mold which is formed with a smooth inner surface. The glass body is produced by pressing a tapered plunger against the heated glass blank which has been provided within the mold, the plunger having a tapered configuration which narrows toward the direction in which the plunger is introduced into the mold. The plunger is provided with elevations and/or recesses upon its exterior which form a molding pattern for the glass blank. The surfaces of the molding pattern are arranged to extend at least partially angularly relative to the plunger axis. In the process of the present invention the blank is finish-blown in a finishing mold.

In the prior art it has been known that certain optical effects can be achieved in hollow glass bodies if the inner wall of such bodies is formed with a relief structure while the outer wall thereof is smooth. Known methods for the production of such hollow bodies include, for example, a method described in German Pat. No. 2,147,349 wherein a hollow blank having an inner wall structure is first produced in a blank mold from a glass drop by means of a plunger having an outer structure. The glass is subsequently brought into a final form by suction or pressure blow deformation. The application of this method, however, encounters difficulties because of the fact that the plunger, which must be introduced into a glass mass which is still in a plastic state in order to form the inner relief structure, must subsequently be withdrawn from the formed glass after a pressing operation. In order to permit this approach to be effectively applied, the plunger may only have a molding pattern on its outer surface which is comprised of surfaces which are helically extending or parallel to the longitudinal axis of the plunger.

With a molding pattern involving axially parallel surfaces, a plunger which is tapered in the direction in which it is pressed into the glass mass may be removed after the pressing operation by withdrawing the plunger axially from the blank mold containing the plastic glass mass. However, such an operation is not possible where the molding pattern on the plunger contains surfaces, elevations or recesses which extend angularly relative to the plunger axis. This is due to the fact that the respective recesses or elevations formed in the glass blank would be sheared off during the axial withdrawal of the plunger by the boundary surfaces of the molding pattern formed upon the plunger exterior.

Such boundary surfaces of the elevations and/or recesses of the molding pattern extending angularly to the plunger axis are only possible if they are arranged in a helical configuration, with the plunger being turned out from the blank mold corresponding to the pitch of the helix.

In any case, the elevations and/or recesses must be steady; that is, they must not involve interruptions since such interruptions will lead to sawtooth interlocking of the glass material and of the plunger thereby preventing the plunger from being smoothly withdrawn from the mold. Thus, certain limits are created with regard to the type of inner wall structure which may be produced. For example, it is not possible to produce with known methods a relief structure on the inner wall of a glass body where the relief surfaces extend transversely to the direction of motion of the plunger.

Another disadvantage of known prior art methods involves the fact that the production of hollow glass bodies having helical elevations and/or depressions requires a rather elaborate rotary drive feed mechanism which must be adapted exactly to the helical course of the plunger. It will be obvious that this will involve considerable structural complexity requiring substantial production efforts and high costs.

Blanks for the production of hollow glass bodies having any type of desired inner wall structure could, heretofore, be produced only with plungers which include a plurality of compressed air channels. In this manner, a blank may be widened by means of compressed air conducted through the channels thus enabling the plunger to be removed therefrom. The disadvantages of such a method, however, involved the fact that the compressed air channels give rise to a considerable increase in the cost of the plunger which thereby requires additional pressure tight compressed air structures of elements. Furthermore, the blank mold must be removed before the widening operation and the plastic blank must be supported by another mold during such widening.

The present invention is intended to provide a method for avoiding the aforementioned problems and overcoming the disadvantages discussed above. The invention permits the production of hollow glass bodies whose inner wall structure consists of elevations and/or depressions which include surfaces which extend at least partly angularly to the axis of the plunger. The solution offered by the present invention involves a method wherein the plunger is axially removed from the blank mold or blank after it has been axially pressed thereinto. The invention is essentially based upon the concept of designing the plunger so that no plunger surfaces exist which will be behind the glass material of the blank, taken in the direction in which the pressing operation is performed. In this manner, the plunger may be removed from the blank easily and without damage. The invention provides a plunger whose molding surfaces either detach themselves immediately from the inner surface of the blank or slide, as in the case of axially parallel plunger surfaces, at first along the opposite inner surface of the blank.

SUMMARY OF THE INVENTION

Briefly, the present invention involves a method for producing blown hollow glass bodies having an optical inner wall structure wherein a heated glass blank is first introduced into a hollow mold cavity. A plunger is inserted into the mold cavity and pressed against the glass blank in order to form the hollow glass body with its optical inner wall configuration. The plunger is generally configured with a central longitudinal axis and an exterior configuration which generally tapers toward a narrower leading end of the plunger in the direction in which the plunger is inserted into the mold. The plunger has on its outer surface a molding pattern which coincides with the inner wall structure to be formed within the glass blank. Generally, the molding pattern is composed of surfaces which extend transversely relative to the plunger axis. After the plunger has been pressed against the heated blank within the hollow mold cavity, it is axially withdrawn from the mold and the blank is then finish blown in a finishing mold.

More specifically, the molding pattern formed on the exterior surface of the tapered plunger is helically shaped with a main pattern surface and a secondary pattern surface being formed thereupon. In one aspect of the invention, the main pattern surface is arranged to extend at an angle of at least 90° relative to the diameter of the plunger. The main pattern surface may be formed to extend perpendicularly to the plunger diameter. Furthermore, the secondary surface, which forms an angle with the main surface, may be arranged to coincide with the diameter of the plunger.

The method according to the present invention may be carried out by using conventional equipment wherein, however, the plunger is configured in accordance with the present invention with an exterior angle between the main pattern surface and the plunger diameter, or its extension beyond the superficies of the plunger, in each axial longitudinal direction being at least 90° for each elevation and/or depression formed on the plunger surface. The term "exterior angle" is to be understood to refer to the angle facing the superficies of the plunger. If the main pattern surface is perpendicular to the diameter of the plunger, or if the exterior angle is 90°, the main surface will slide over the inner surface of the blank opposed to the main surface when the plunger is removed. With a larger exterior angle, or with a curved course, the main surface detaches itself immediately from the opposed inner surface of the blank.

The main pattern surface together with the secondary pattern surface will define the recess or the elevation of the plunger pattern surface. The main surface may be defined to have a line extending therethrough which will coincide with the plunger diameter or form with the plunger diameter an exterior angle which is a maximum of 90°. If the line lying in the main pattern surface is curved, the exterior angle between the tangent passing through the intersection fromed with the superficies of the plunger and the diameter must be at least 90°. With a curved secondary surface, the exterior angle between the tangent passing through the intersection with the superficies may be a maximum of 90°.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive in which there are illustrated and described preferred embodiments of the invention.

DETAILED DESCRIPTION OF THE PREFERRED EMBODIMENTS

Figure 1:
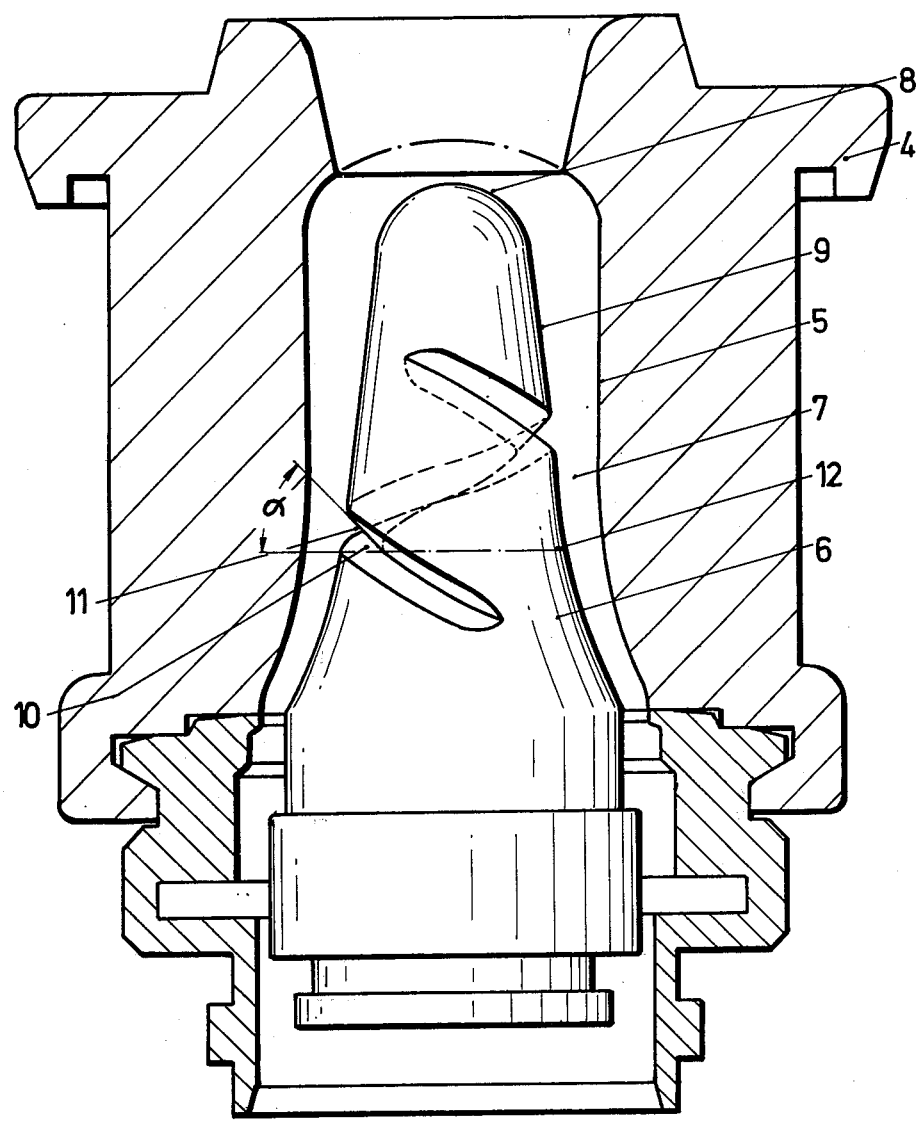
FIG. 1 is a sectional elevation showing a blank mold with a glass blank therein and including a conventional plunger having a helical groove at the end of the press.

Referring now to FIG. 1, there is shown a blank mold 4 having a smooth inner surface 5, with the mold 4 being filled, prior to a pressing operation, with a glass material which initially is drop-shaped and which is brought into the form of a blank 7 by means of a plunger 6. The conventional plunger 6 shown in FIG. 1, is formed with a tapering configuration which narrows in the direction of pressing of the plunger into the blank 7 or in the direction of a rounded plunger end 8 which is the leading end of the plunger. The plunger 6 has in its superficies 9 to a helical recess or groove 10 which is defined by a main surface and a secondary surface. In the axial longitudinal section represented in the drawing there can be seen only a main surface line 11 which lies within the main surface of the groove 10 and a secondary surface line, which lies within the plane of the secondary surface, and which coincides with the diameter of the plunger. An exterior angle a facing the superficies 9 between the main surface line 11 and the plunger diameter 12 is, as shown in the drawing, clearly under 90°. Consequently, the main surface is behind the helical relief on the inner surface of the blank 7, taken in the direction in which the plunger is pressed into the blank 7 or in the direction of the rounded plunger end 8. The plunger must therefore be turned out of the blank, otherwise the main surface would shear off the relief of the blank 7 in front of it.

Figure 2:
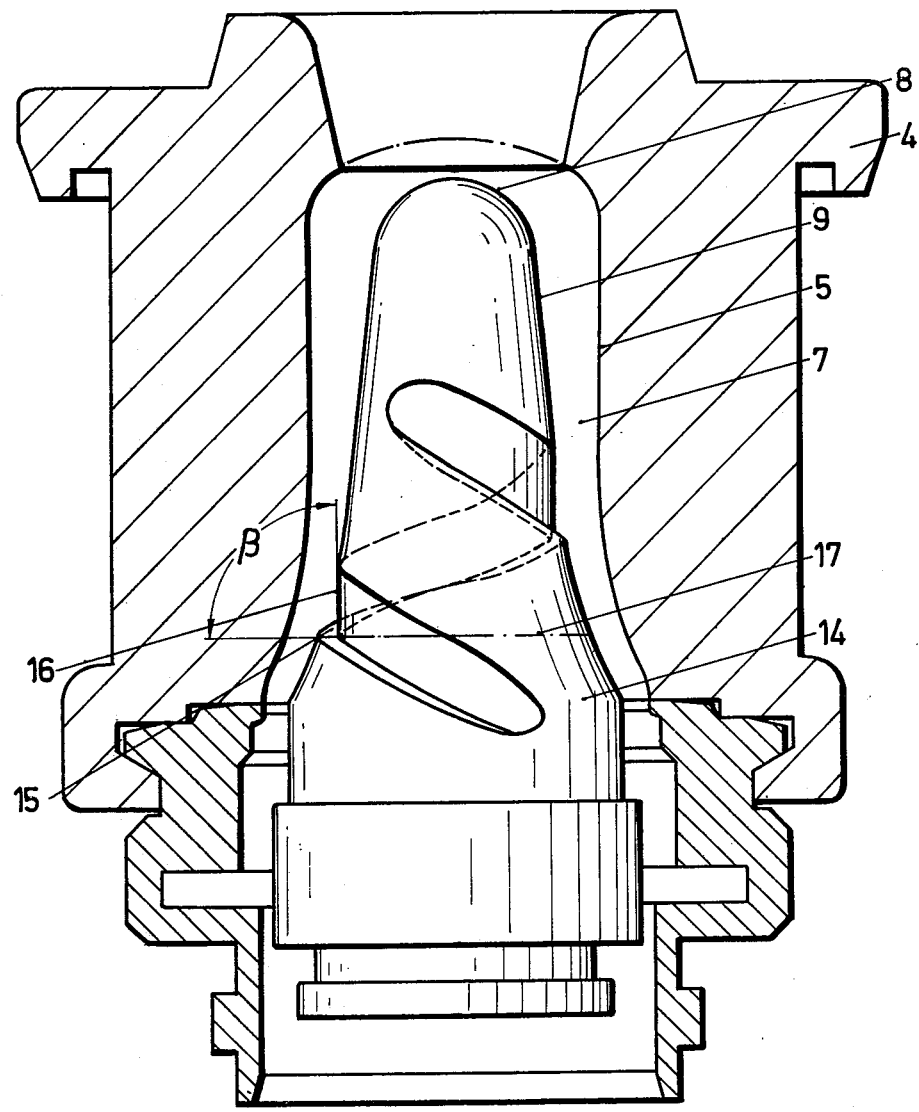
FIG. 2 is a sectional elevation showing a blank mold having a glass blank therein and with a plunger which also comprises a helical groove at the end of the press.

Referring now to FIG. 2, a plunger 14 in accordance with the invention likewise serves for the production of a blank 7 having a helical relief on its inner surface. However, unlike the conventional plunger shown in FIG. 1, the plunger 14 according to the invention has a helical recess or groove 15 whose main surface line 16 is perpendicular to the diameter 17. Accordingly, an exterior angle β facing the superficies 9 between a main surface line 16 and the diameter 17 is 90°. If the main surface line 16 does not extend perpendicularly to the diameter 17, then the exterior angle must be at least 90°. This produces the result that the plunger 14 may be pulled out axially from the blank mold 4 and the mold 7, with the main surface sliding over the opposite relief surface of the blank 7, while the secondary surface coinciding with the diameter 17 detaches itself immediately from the opposite relief surface of the blank 7.

Figure 3:
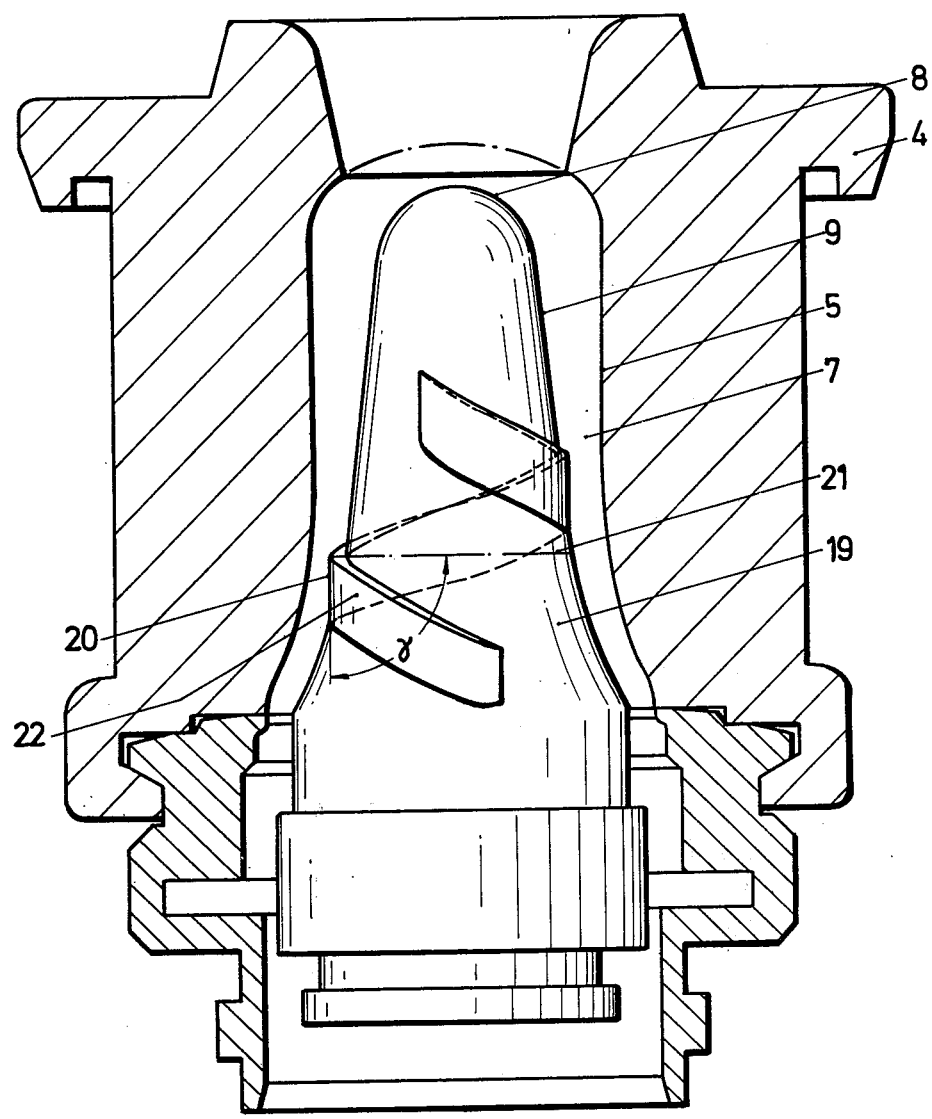
FIG. 3 is a sectional elevation showing a blank mold with a blass blank and having a plunger according to the invention with a helical relief at the end of the press.

In FIG. 3 there is represented a plunger 19 having on its superficies 9 a helical fin or extension 20, with the plunger 19 serving to effect the production of a blank 7 having a corresponding helical recess or groove. In the case of the embodiment shown in FIG. 3, an exterior angle γ between a diameter 21 of the plunger and a main surface line 22 is at least 90°. Consequently, the plunger may be withdrawn axially from the mold blank 4 after the pressing operation, and the secondary surface coinciding with the diameter 21 will detach itself immediately from the surface line opposite thereto forming part of the groove which is established in the blank 7. Simultaneously, the main surface will slide along the surface of the groove of the blank opposed thereto.

If the secondary surface line does not coincide with the diameter, that is if it forms with the diameter an exterior angle, then this angle can be, at most, a maximum of 90°.

A blank produced in accordance with the method of the present invention need only be finish-blown in a rotating or stationary finishing mold, an operation which may be performed in a known manner. Naturally, the finished hollow glass body may also have an optical outer wall structure which may be produced in a known manner.

In accordance with the present invention, and pursuant to the embodiments thereof hereinbefore described, it will be seen that the plunger may always be withdrawn axially whenever the secondary surface line, taken relative to the axial cross section of the plunger, extends radially with the opposite surface line extending at an angle of at least 90° relative to the diameter or forming with the diameter an angle of up to a maximum of 90°. This insures that no part of the blank will ever be in the path of motion of the plunger when it is drawn axially. On the other hand, any pattern may be applied on the inner wall of a blank with the plunger according to the invention, it only being necessary to insure that the aforementioned exterior angle is at least 90°. This is easily possible and, therefore, a plunger is obtained which may be produced at a cost similar to that of conventional plungers but which will give rise to an advantage in that the patterns which are to be formed may be selected freely and that, furthermore, no complicated rotary drive will be necessary for operation of the plunger.

While specific embodiments of the invention have been shown and described in detail to illustrate the application of the invention principles, it will be understood that the invention may be embodied otherwise without departing from such principles.

What is claimed is:

1. A method for the production of blown hollow glass bodies having an optical inner wall structure comprising the steps of introducing a heated glass blank into a hollow mold cavity, providing a plunger having a central longitudinal axis and an exterior surface generally formed in a configuration tapering toward a narrower leading end of said plunger, said plunger being adapted to be inserted into said mold cavity with said leading end first and to be pressed against said glass blank to form said hollow glass body, forming on the exterior surface of said plunger a helically shaped molding pattern adapted to shape the inner wall structure of said glass body when said plunger is pressed against said glass blank, said helical molding pattern comprising a main pattern surface configured to extend throughout said helical molding pattern at an angle of not less than 90° relative to the diameter of said plunger, said angle being taken as an exterior angle relative to the body of said plunger when the diameter from which said angle is taken is located rearwardly of said main pattern surface relative to said leading end of said plunger, said angle being taken as an interior angle relative to the body of said plunger when the diameter from which said angle is taken is located forwardly of said main pattern surface relative to said leading end of said plunger, inserting said plunger into said mold cavity and pressing said plunger against said glass blank to form said hollow glass body with an optical inner wall configured with a pattern coinciding with the molding pattern on the exterior surface of said plunger, and withdrawing said plunger axially from said mold after pressing said plunger against said glass blank.

2. A method according to claim 1 wherein said blank is finish-blown in a stationary finishing mold.

3. A method according to claim 1 wherein said plunger comprises a profile which is devoid of undercuts.

* * * * *